US012715057B2

(12) United States Patent
Yue et al.

(10) Patent No.: US 12,715,057 B2
(45) Date of Patent: Aug. 25, 2026

(54) END MILL WITH GRADIENT EDGE GEOMETRY AND GRINDING METHOD THEREOF

(71) Applicant: Harbin University of Science and Technology, Harbin (CN)

(72) Inventors: Caixu Yue, Harbin (CN); Haotuo Liu, Harbin (CN); Jiaqi Zhou, Harbin (CN); Jiaxu Qu, Harbin (CN); Yao Lu, Harbin (CN); Xianli Liu, Harbin (CN); Zhipeng Jiang, Harbin (CN)

(73) Assignee: Harbin University of Science and Technology, Harbin (CN)

( * ) Notice: Subject to any disclaimer, the term of this patent is extended or adjusted under 35 U.S.C. 154(b) by 41 days.

(21) Appl. No.: 19/260,250

(22) Filed: Jul. 3, 2025

(65) Prior Publication Data

US 2026/0108959 A1 Apr. 23, 2026

(30) Foreign Application Priority Data

Oct. 22, 2024 (CN) ........................ 202411475053.9

(51) Int. Cl.
*B23C 5/10* (2006.01)
*B24B 19/02* (2006.01)

(52) U.S. Cl.
CPC ................ *B23C 5/10* (2013.01); *B24B 19/02* (2013.01); *B23C 2210/0407* (2013.01); *B23C 2210/12* (2013.01)

(58) Field of Classification Search
CPC .............. B23C 5/10; B23C 2210/0407; B23C 2210/12; B24B 19/02
See application file for complete search history.

(56) References Cited

U.S. PATENT DOCUMENTS

| | | | | |
|---|---|---|---|---|
| 6,475,065 | B1 | 11/2002 | Holmes | |
| 2016/0060963 | A1 * | 3/2016 | Azar ....................... | E21B 10/43 175/430 |

FOREIGN PATENT DOCUMENTS

| | | | |
|---|---|---|---|
| CN | 102233452 | A | 11/2011 |
| CN | 103962615 | A | 8/2014 |

(Continued)

OTHER PUBLICATIONS

Tao Chen, et al., The Key Technology of Torus End Milling Cutter with Circular Corner Design, Journal of Harbin University of Science and Technology, 2017, pp. 75-79, vol. 22 No. 1.

(Continued)

*Primary Examiner* — Yoshihisa Ishizuka
(74) *Attorney, Agent, or Firm* — Bayramoglu Law Offices LLC

(57) ABSTRACT

An end mill with a gradient edge geometry and a grinding method thereof relate to the technical field of metal cutting. Through multi-dimensional data acquisition, the grinding method comprehensively evaluates a cutting load, a cutting temperature and a cutting vibration amplitude of the tool, and overcomes limitations of the conventional method. By setting a lifetime evaluation criterion and an alert threshold, the grinding method forms a scientific evaluation system, improving accuracy of the evaluation and lifetime of the tool. By combining a preliminary adjustment strategy with a fine adjustment strategy, the grinding method improves the adaptability of the tool in complex conditions, ensuring that the tool works in an optimal state all the time. At last, with fine adjustment on the adjustment index, the grinding method realizes collaborative optimization of various parameters, improves the performance of the tool, and expands the application range, providing an effective solution for high-precision machining.

14 Claims, 2 Drawing Sheets

(56) References Cited

FOREIGN PATENT DOCUMENTS

| | | | | | |
|---|---|---|---|---|---|
| CN | 104959667 | A | | 10/2015 | |
| CN | 111069666 | A | * | 4/2020 | ............... B23C 1/00 |
| CN | 113649632 | A | | 11/2021 | |
| CN | 117972887 | A | | 5/2024 | |
| JP | H0819913 | A | | 1/1996 | |
| JP | H0871831 | A | | 3/1996 | |
| JP | 2010280051 | A | | 12/2010 | |

OTHER PUBLICATIONS

Tao Chen, et al., Experimental study on cutting tool wear in milling carbon fiber composites with spiral staggered diamond-coated milling cutter, The International Journal of Advanced Manufacturing Technology, 2018.

* cited by examiner

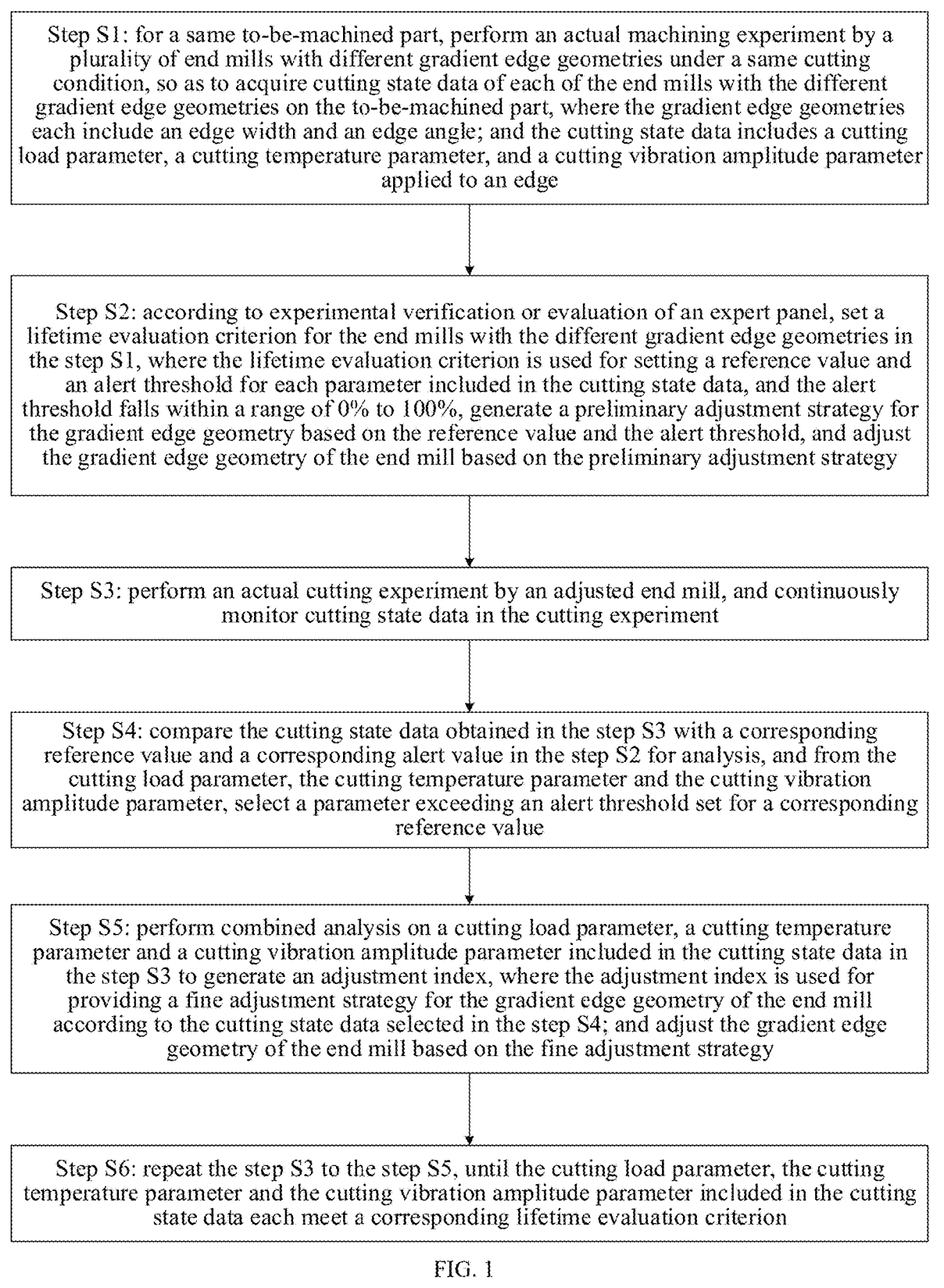

Step S1: for a same to-be-machined part, perform an actual machining experiment by a plurality of end mills with different gradient edge geometries under a same cutting condition, so as to acquire cutting state data of each of the end mills with the different gradient edge geometries on the to-be-machined part, where the gradient edge geometries each include an edge width and an edge angle; and the cutting state data includes a cutting load parameter, a cutting temperature parameter, and a cutting vibration amplitude parameter applied to an edge

↓

Step S2: according to experimental verification or evaluation of an expert panel, set a lifetime evaluation criterion for the end mills with the different gradient edge geometries in the step S1, where the lifetime evaluation criterion is used for setting a reference value and an alert threshold for each parameter included in the cutting state data, and the alert threshold falls within a range of 0% to 100%, generate a preliminary adjustment strategy for the gradient edge geometry based on the reference value and the alert threshold, and adjust the gradient edge geometry of the end mill based on the preliminary adjustment strategy

↓

Step S3: perform an actual cutting experiment by an adjusted end mill, and continuously monitor cutting state data in the cutting experiment

↓

Step S4: compare the cutting state data obtained in the step S3 with a corresponding reference value and a corresponding alert value in the step S2 for analysis, and from the cutting load parameter, the cutting temperature parameter and the cutting vibration amplitude parameter, select a parameter exceeding an alert threshold set for a corresponding reference value

↓

Step S5: perform combined analysis on a cutting load parameter, a cutting temperature parameter and a cutting vibration amplitude parameter included in the cutting state data in the step S3 to generate an adjustment index, where the adjustment index is used for providing a fine adjustment strategy for the gradient edge geometry of the end mill according to the cutting state data selected in the step S4; and adjust the gradient edge geometry of the end mill based on the fine adjustment strategy

↓

Step S6: repeat the step S3 to the step S5, until the cutting load parameter, the cutting temperature parameter and the cutting vibration amplitude parameter included in the cutting state data each meet a corresponding lifetime evaluation criterion

FIG. 1

END MILL WITH GRADIENT EDGE GEOMETRY AND GRINDING METHOD THEREOF

CROSS REFERENCE TO THE RELATED APPLICATIONS

This application is based upon and claims priority to Chinese Patent Application No. 202411475053.9, filed on Oct. 22, 2024, the entire contents of which are incorporated herein by reference.

TECHNICAL FIELD

The present disclosure relates to the technical field of metal cutting, and in particular to an end mill with a gradient edge geometry and a grinding method thereof.

BACKGROUND

When conventional milling cutters are used to cut a nickel-based superalloy, due to a large cutting force, chips are not broken easily and thus form stringy chips, causing large stress and serious wear to the tool. Moreover, the chips easily adhere to an edge of the tool in the cutting process, which increases the load on the tool. Due to difficult-to-break chips, serious wear of the tool, and the like, the cutting process is not stable enough, thereby causing poor surface quality and accuracy of a workpiece. The existing research mainly focuses on influences of an edge geometry on the cutting force, cutting temperature and cutting vibration. However, due to a lack of systematic optimization and verification methods, there are still some technical bottlenecks.

In the prior art, the Chinese Patent Application No. CN 117972887 A provides a method and system for modeling a cutting force of an unequal gradient helix milling cutter. With differentiation on a helix angle variable, the milling cutter is decomposed into a plurality of cutting blade differential elements. The deformation process of the workpiece during milling is equivalently taken as a variable cross-section stepped cantilever beam model to calculate an instantaneous cutting thickness. An amount of elastic deformation is used to calculate a workpiece deformation-considered differential force. A frictional effect force model is introduced to calculate a tool wear-considered differential force. The workpiece deformation-considered differential force and the tool wear-considered differential force are summed, and are integrated in a range of a helix angle, thereby obtaining a milling force model through which the unequal gradient helix tool cuts a frame beam part at different degrees of wear. For the problem that the cutting force model based on axial differentiation is inapplicable due to a variable helix angle of each edge line of the unequal gradient helix tool, on the basis of a type II mechanical model, the helix angle is taken as a differential object to calculate the differential cutting force, thereby establishing a dynamic milling force model of the unequal gradient helix tool in the cutting process.

In the conventional methods, performance evaluation on the gradient edge largely depends on experience or single indexes, rather than systematic data analytics and optimization strategies, such that an optimal design of the edge is achieved hardly. Moreover, existing evaluation criteria and parameter settings often take the complexities of different machining conditions into considerations inadequately, resulting in that the lifetime and machining stability of the edge are predicted and controlled hardly in actual application. Additionally, for collaborative optimization of various parameters, there lacks an effective method to balance and adjust these parameters in the prior art.

The information disclosed in the background is merely intended to facilitate the comprehension to the background of the present disclosure, and thus can include information that does not constitute the prior art known to those of ordinary skill in the art.

SUMMARY

An objective of the present disclosure is to provide an end mill with a gradient edge geometry and a grinding method thereof, to solve the problems as mentioned above.

In order to achieve the above objective, the present disclosure provides the following technical solutions:

The present disclosure provides a grinding method of an end mill with a gradient edge geometry, which is applied to a tool including a cutter head, a cutting blade, an edge, and an end blade, and specifically includes:

step S1: for a same to-be-machined part, performing an actual machining experiment by a plurality of end mills with different gradient edge geometries under a same cutting condition, so as to acquire cutting state data of each of the end mills with the different gradient edge geometries on the to-be-machined part, where the gradient edge geometries each include an edge width and an edge angle; and the cutting state data includes a cutting load parameter, a cutting temperature parameter, and a cutting vibration amplitude parameter applied to an edge;

step S2: according to experimental verification or evaluation of an expert panel, setting a lifetime evaluation criterion for the end mills with the different gradient edge geometries in the step S1, where the lifetime evaluation criterion is used for setting a reference value and an alert threshold for each parameter included in the cutting state data, and the alert threshold falls within a range of 0% to 100%; generating a preliminary adjustment strategy for the gradient edge geometry based on the reference value and the alert threshold; and adjusting the gradient edge geometry of the end mill based on the preliminary adjustment strategy;

step S3: performing an actual cutting experiment by an adjusted end mill, and continuously monitoring the cutting state data in the cutting experiment;

step S4: comparing the cutting state data obtained in the step S3 with a corresponding reference value and a corresponding alert value in the step S2 for analysis, and from the cutting load parameter, the cutting temperature parameter and the cutting vibration amplitude parameter, selecting a parameter exceeding an alert threshold set for the corresponding reference value;

step S5: performing combined analysis on the cutting load parameter, the cutting temperature parameter and the cutting vibration amplitude parameter included in the cutting state data in the step S3 to generate an adjustment index, where the adjustment index is used for providing a fine adjustment strategy for the gradient edge geometry of the end mill according to the cutting state data selected in the step S4; and adjusting the gradient edge geometry of the end mill based on the fine adjustment strategy; and step S6: repeating the step S3 to the step S5, until the cutting load parameter, the cutting temperature parameter and the cutting vibration amplitude parameter included in the cutting state data each meet a corresponding lifetime evaluation criterion.

Further, a cutting load parameter evaluation criterion is as follows:

taking an initial cutting load parameter of the tool with a gradient edge geometry as the reference value; and when a main cutting force or a side cutting force exceeds a first alert threshold of the reference value, determining that the tool is in a to-be-worn state, and adjusting the gradient edge geometry of the tool, where the first alert threshold is set as 30%;

respectively setting a main cutting force and a side cutting force at time t as CLm(t) and CLs(t); and respectively marking an initial main cutting force and an initial side cutting force as CLm(0) and CLs(0), and when the main cutting force CLm(t) or the side cutting force CLs(t) at any time meets the following condition, triggering a wear warning, where the preliminary adjustment strategy is to decrease the edge width RKd or increase the edge angle RKj;

$$\frac{CLm(t)-CLm(0)}{CLm(0)}>30\%$$

$$\frac{CLs(t)-CLs(0)}{CLs(0)}>30\%$$

a cutting temperature parameter evaluation criterion is as follows:

setting an initial temperature CT(0) as the reference value of the cutting temperature parameter, and when the cutting temperature parameter exceeds a second alert threshold of the initial temperature, a thermal fatigue of the tool is increased, triggering a temperature warning, and adjusting the gradient edge geometry of the tool, where the second alert threshold is set as 20%;

marking a cutting temperature at the time t as CT(t); and when $$\frac{CT(t)-CT(0)}{CT(0)}>20\%$$

is satisfied, triggering a warning state for the thermal fatigue of the tool, and only increasing the edge width RKd; and a cutting vibration amplitude parameter evaluation criterion is as follows:

setting an initial vibration amplitude CV(0) as the reference value of the cutting vibration amplitude parameter, and when the cutting vibration amplitude parameter increases to exceed a third alert threshold of the initial vibration amplitude, the tool being in an unstable vibration state, triggering a vibration warning, and adjusting the gradient edge geometry of the tool;

setting a cutting vibration amplitude parameter at the time t as CV(t), where the third alert threshold is 50%; and when $$\frac{CV(t)-CV(0)}{CV(0)}>50\%$$

is satisfied, decreasing the edge angle.

Further, comparing the cutting state data obtained in the step S3 with the corresponding reference value and the corresponding alert value in the step S2 for the analysis, and from the cutting load parameter, the cutting temperature parameter and the cutting vibration amplitude parameter, selecting the parameter exceeding the alert threshold set for the corresponding reference value specifically include:

based on the cutting load parameter evaluation criterion, marking a main cutting force exceeding the first alert threshold of the initial main cutting force as CLm'(t+1);

based on the cutting load parameter evaluation criterion, marking a side cutting force exceeding the first alert threshold of the initial side cutting force as CLs'(t+1);

based on the cutting temperature parameter evaluation criterion, marking a cutting temperature parameter exceeding the second alert threshold of the initial temperature as CT'(t+1); and based on the cutting vibration amplitude parameter evaluation criterion, marking a cutting vibration amplitude parameter exceeding the third alert threshold of the initial vibration amplitude as CV'(t+1).

Further, the adjustment index is used for providing the fine adjustment strategy for the preliminary adjustment strategy according to the cutting state data selected in the step S4, specifically including:

defining the adjustment index as $AI_{total}$ that is calculated by:

$$AI_{total}=\frac{w_1\times AI_{CL}+w_2\times AI_{CT}+w_3\times AI_{CV}}{AI_{CL}+AI_{CT}+AI_{CV}+1}$$

where $AI_{CL}$ is a cutting load adjustment index, and represents a relative variation of the cutting load parameter; and the $AI_{CL}$ is calculated by:

$$AI_{CL}=\frac{\sqrt{\left|\frac{CLm(t+1)-CLm(0)}{CLm(0)}+\frac{CLs(t+1)-CLs(0)}{CLs(0)}\right|}+\eta 1}{2}$$

where η1 is a positive constant term, and 0.08≤η1≤0.65, ensuring that the $AI_{CL}$ is greater than 0;

$AI_{CT}$ is a cutting temperature adjustment index, and represents a relative variation of the cutting temperature; and the $AI_{CT}$ is calculated by:

$$AI_{CT}=\left|\frac{CT(t+1)-CT(0)}{CT(0)}\right|+\eta 2$$

where η2 is a positive constant term, and 0.03≤η2≤0.53, ensuring that the $AI_{CT}$ is greater than 0;

$AI_{CV}$ is a cutting vibration adjustment index, represents a relative variation of the cutting vibration, and is calculated by:

$$AI_{CV}=\left|\frac{CV(t+1)-CV(0)}{CV(0)}\right|+\eta 3$$

where η3 is a positive constant term, and 0.011≤η3≤0.71, ensuring that the $AI_{CV}$ is greater than 0; and providing the fine adjustment strategy for the preliminary adjustment strategy includes:

determining cutting state data exceeding the alert threshold in the step S4, sorting parameters in the CLm'(t+1), the CLs'(t+1), the CT'(t+1), and the CV'(t+1) in a descending sequence, and according to a sorted result, adjusting an allocation proportion of a corresponding weight coefficient as follows:

when any one of the CLm'(t+1) and the CLs'(t+1) is sorted at a first position, increasing a current value of $w_1$ by 10%, and decreasing $w_2$ and $w_3$ by a same value, to ensure $$w_1+w_2+w_3=1;$$

when the CT'(t+1) is sorted at the first position, increasing a current value of the $w_2$ by 10%, and decreasing the $w_1$ and the $w_3$ by a same value, to ensure $w_1+w_2+w_3=1$;

when the CV'(t+1) is sorted at the first position, increasing a current value of the $w_3$ by 10%, and decreasing the $w_1$ and the $w_1$ by a same value, to ensure $w_1+w_2+w_3=1$;

adjusting an edge width RKd(t+1) upon the preliminary adjustment strategy as:

$$RKd'(t+1)=\frac{RKd(t+1)\times(1+\Delta RKd\,\%)}{AI_{total}+RKd(t+1)+\Delta RKd\,\%}$$

where ΔRKd % is a width adjusted percentage based on the adjustment index; and RKd'(t+1) is an adjusted edge width upon the fine adjustment strategy; and adjusting an edge angle RKj(t+1) upon the preliminary adjustment strategy as:

$$RKj'(t+1)=\frac{RKj(t+1)+\Delta RKj^{\circ}}{AI_{total}+RKj(t+1)+\Delta RKj^{\circ}}$$

where ΔRKj° is an adjusted angle based on the adjustment index; and RKj'(t+1) is an adjusted edge angle upon the fine adjustment strategy.

Further, until the parameter included in the cutting state data meets the corresponding lifetime evaluation criterion, a specific stop condition includes:

according to the cutting load parameter evaluation criterion, taking $$\begin{cases}\dfrac{CLm(t+1)-CLm(0)}{CLm(0)}\le 30\% \\ \dfrac{CLs(t+1)-CLs(0)}{CLs(0)}\le 30\%\end{cases}$$

as a loop stop condition for the cutting loading parameter;

according to the cutting temperature parameter evaluation criterion, taking $$\frac{CT(t+1)-CT(0)}{CT(0)}\le 20\%$$

as a loop stop condition for the cutting temperature parameter; and according to the cutting vibration amplitude parameter evaluation criterion, taking $$\frac{CV(t+1)-CV(0)}{CV(0)}\le 50\%$$

as a loop stop condition for the cutting vibration amplitude parameter.

The present disclosure provides an end mill with a gradient edge geometry, configured to implement the grinding method of an end mill with a gradient edge geometry.

The tool further includes a shank and a chip flute.

At least four cutting blades are provided on the cutter head; the cutting blade includes a front portion provided with the chip flute, and a rear portion provided with the edge and the end blade; a bottom blade intersecting with the cutting blade is provided at a bottom of the cutter head; the edge changes gradually along a guide line; edges on the at least four cutting blades are provided alternately in an odd-numbered edge and an even-numbered edge; and the odd-numbered edge and the even-numbered edge change inversely in geometry.

The bottom blade intersecting with the cutting blade is provided at the bottom of the cutter head; and the at least four cutting blades are uniformly spaced in an axial direction of the cutter head.

The edge is an inclined plane; two sides of the edge incline inward gradually along the guide line; and the edge width is a distance narrowing gradually from an end blade side to a shank side.

The guide line is formed by connecting segments of a brachistochrone curve and a circular arc segment; and the circular arc segment is located between the segments of the brachistochrone curve, such that a changing speed of the edge width is reduced gradually.

Compared with the prior art, the present disclosure has the following beneficial effects: Through multi-dimensional data acquisition, the present disclosure comprehensively evaluates the cutting load, the cutting temperature and the cutting vibration amplitude of the tool, and overcomes limitations of the conventional method. By setting the lifetime evaluation criterion and the alert threshold, the present disclosure forms a scientific evaluation system, improving accuracy of the evaluation and lifetime of the tool. Meanwhile, by combining the preliminary adjustment strategy with the fine adjustment strategy, the present disclosure improves the adaptability of the tool in complex conditions, ensuring that the tool works in an optimal state all the time. At last, with fine adjustment on the adjustment index, the present disclosure realizes collaborative optimization of various parameters, improves the performance of the tool, and expands the application range, providing an effective solution for high-precision machining. Thanks to these beneficial effects, the present disclosure significantly improves the machining efficiency and quality, and overcomes the shortages of the prior art.

With the gradient design of the edge geometry, from a rough portion to a fine portion of the tool, the present disclosure realizes the gradual layer-by-layer cutting effect, improves the adaptability of the tool, and realizes desirable transition from rough cutting to fine cutting, thereby improving a chip breaking effect during the cutting, and preventing adhesion to the tool.

With the gradient edge geometry, the present disclosure can further reduce the load on each edge, thereby alleviating the cutting load on the tool, relieving the wear on the tool, and improving the lifetime of the tool.

BRIEF DESCRIPTION OF THE DRAWINGS

FIG. 1 is a schematic flowchart of an overall method according to the present disclosure;

DETAILED DESCRIPTION OF THE EMBODIMENTS

In order to make the objectives, technical solutions, and advantages of the present disclosure clearer, the present disclosure is further described in detail below with reference to specific embodiments.

It should be noted that unless otherwise defined, technical or scientific terms used in the present disclosure should have ordinary meanings understood by those of ordinary skill in the art to which the present disclosure belongs. Terms such as "first" and "second" used herein do not denote any order, quantity or importance, but are merely intended to distinguish between different constituents. "Comprising", "containing", and similar words mean that elements or articles appearing before "comprising" or "containing" include the elements or articles and their equivalent elements appearing behind "comprising" or "containing", not excluding any other elements or articles. "Connected", "connected to each other" and similar words are not restricted to physical or mechanical connections, but may include direct and indirect electrical connections. "Upper", "lower", "left", "right", and the like are used only to indicate a relative positional relationship, and when the absolute position of the described object is changed, the relative positional relationship is also changed accordingly.

Embodiment 1

Figure 2:
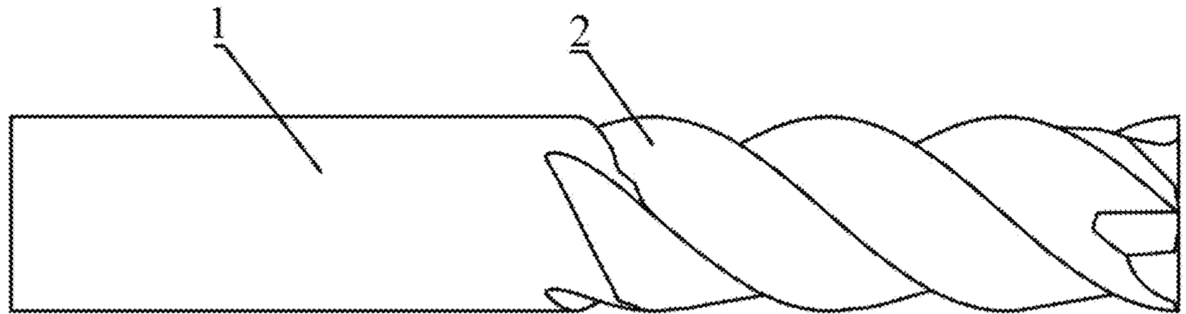
FIG. 2 is a schematic view of an end mill with a gradient edge geometry according to the present disclosure.
Figure 3:
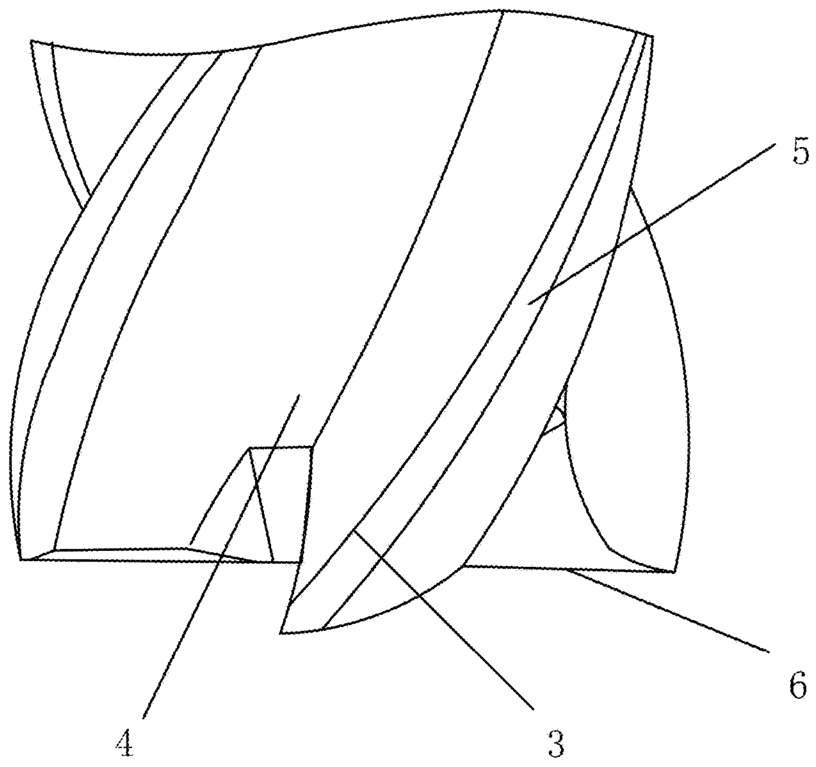
FIG. 3 is a schematic view of a cutter head region in FIG. 2.

Referring to FIG. 1, FIG. 2, and FIG. 3, the present disclosure provides the following technical solutions:

The present disclosure provides a grinding method of an end mill with a gradient edge geometry, which is applied to a tool including cutter head 2, cutting blade 3, edge 5, and end blade 6, and specifically includes the following steps:

Step S1: For a same to-be-machined part, an actual machining experiment is performed with a plurality of end mills with different gradient edge geometries under a same cutting condition, so as to acquire cutting state data of each of the end mills with the different gradient edge geometries on the to-be-machined part, where the gradient edge geometries each include an edge width and an edge angle; and the cutting state data includes a cutting load parameter, a cutting temperature parameter, and a cutting vibration amplitude parameter applied to an edge.

Step S2: According to experimental verification or evaluation of an expert panel, a lifetime evaluation criterion is set for each of the end mills with the different gradient edge geometries in Step S1, where the lifetime evaluation criterion is used for setting a reference value and an alert threshold for each parameter included in the cutting state data, and the alert threshold falls within a range of 0% to 100%; a preliminary adjustment strategy for the gradient edge geometry is generated based on the reference value and the alert threshold; and the gradient edge geometry of the end mill is adjusted based on the preliminary adjustment strategy.

Step S3: An actual cutting experiment is performed with an adjusted end mill, and cutting state data in the cutting experiment is continuously monitored.

Step S4: The cutting state data obtained in Step S3 is compared with a corresponding reference value and a corresponding alert value in Step S2 for analysis, and from the cutting load parameter, the cutting temperature parameter and the cutting vibration amplitude parameter, a parameter exceeding an alert threshold set for the corresponding reference value is selected.

Step S5: Combined analysis is performed on the cutting load parameter, the cutting temperature parameter and the cutting vibration amplitude parameter included in the cutting state data in Step S3 to generate an adjustment index, where the adjustment index is used for providing a fine adjustment strategy for the gradient edge geometry of the end mill according to the cutting state data selected in Step S4; and the gradient edge geometry of the end mill is adjusted based on the fine adjustment strategy.

Step S6: Step S3 to Step S5 are repeated, until the cutting load parameter, the cutting temperature parameter and the cutting vibration amplitude parameter included in cutting state data each meet a corresponding lifetime evaluation criterion.

Further, the cutting state data of each of the end mills with the different gradient edge geometries on the to-be-machined part is acquired. Specifically:

A material and a specific machining requirement of the to-be-machined part are determined. The machining requirement includes a surface roughness and a machining accuracy. According to the material and the machining requirement of the part, a parameter range meeting the gradient edge geometry is selected preliminarily. The gradient edge geometry includes two key parameters: the edge width and the edge angle. The edge width and the edge angle are sequentially marked as RKd and RKj.

According to the machining accuracy of the part, a preliminary range of the edge width is set as 0.1 mm≤RKd≤0.5 mm.

A range of the edge angle is set as 10°≤RKj≤40°.

According to a parameter range of the gradient edge geometry, end mills with different edge geometries are selected, and the end mills with the different gradient edge geometries are prepared in a grinding process. In the embodiment, at least three end mills with different edge widths and different edge angles are selected. Specifically:

First end mill: The edge width is 0.1 mm, and the edge angle is 10°.

Second end mill: The edge width is 0.3 mm, and the edge angle is 25°.

Third end mill: The edge width is 0.54 mm, and the edge angle is 40°.

The cutting experiment is performed on the to-be-machined part through a computer numerical control (CNC) milling machine. The to-be-machined part is machined with each end mill. To ensure comparability of experimental data, a cutting speed, a feed speed and a cutting depth are the same.

The cutting load parameter applied to the tool in a cutting process of each end mill is measured in real time by a force sensor. The cutting load parameter includes a main cutting force and a side cutting force.

The main cutting force is a cutting force along a main cutting direction of the tool, and is mainly used for cutting the material.

The side cutting force is a cutting force perpendicular to the main cutting direction, and mainly determines stability of the tool and vibration in the cutting process.

The cutting temperature parameter of the edge of the tool is monitored by an infrared thermal imager or an embedded thermocouple sensor.

The cutting vibration amplitude parameter of the tool in the cutting process is recorded by a three-dimensional (3D) vibration sensor.

Further, the lifetime evaluation criterion is used for setting the reference value and the alert threshold for each parameter included in the cutting state data. The alert threshold falls within the range of 0% to 100%. The preliminary adjustment strategy for the gradient edge geometry is generated based on the reference value and the alert threshold.

The lifetime evaluation criterion includes a cutting load parameter evaluation criterion, a cutting temperature parameter evaluation criterion, and a cutting vibration amplitude parameter evaluation criterion.

The cutting load parameter, the cutting temperature parameter and the cutting vibration amplitude parameter of each of the end mills with the different gradient edge geometries are acquired through an experiment. To ensure the comparability of the data, an initial condition of each experiment must be the same strictly. All data is measured by a standard device, and quantized in percentage %. The cutting load parameter, the cutting temperature parameter and the cutting vibration amplitude parameter are sequentially marked as CL, CT and CV The main cutting force and the side cutting force included in the cutting load parameter are sequentially marked as CLm and CLs. An alert threshold of the cutting load parameter, an alert threshold of the cutting temperature parameter and an alert threshold of the cutting vibration amplitude parameter are sequentially set as a first alert threshold, a second alert threshold, and a third alert threshold. The first alert threshold, the second alert threshold and the third alert threshold are adjusted by the expert panel through experimental data.

An edge width and an edge angle adjusted through the preliminary adjustment strategy are sequentially marked as RKd(t+1) and RKj(t+1). t+1 in the RKd(t+1) and the RKj (t+1) is time when the actual cutting experiment in Step S3 is performed.

For the cutting load parameter evaluation criterion:

The main cutting force and the side cutting force of the tool have a direct impact on a wear rate of the tool. Experimental data analysis reveals that with the elapse of service time, the cutting load is increased, which is manifested in an increase in the cutting force. Hence, the reference value is selected. When the main cutting force or the side cutting force changes to exceed the first alert threshold of the reference value, it is determined that the wear of the tool is aggravated, and the lifetime is to be ended.

An initial cutting load parameter of the tool with a gradient edge geometry is taken as the reference value. When the main cutting force or the side cutting force changes to exceed the first alert threshold of the reference value, it is determined that the tool is in a to-be-worn state, and the gradient edge geometry of the tool is adjusted.

The first alert threshold is set as 30%.

A main cutting force and a side cutting force at time t are respectively set as CLm(t) and CLs(t).

An initial main cutting force and an initial side cutting force are respectively marked as CLm(0) and CLs(0). When the main cutting force CLm(t) or the side cutting force CLs(t) at any time meets the following condition, a wear warning is triggered. The preliminary adjustment strategy is to decrease the edge width RKd or increase the edge angle RKj:

$$\frac{CLm(t)-CLm(0)}{CLm(0)} > 30\%$$

$$\frac{CLs(t)-CLs(0)}{CLs(0)} > 30\%$$

The edge width is decreased by 10%:

$$RKd(t+1) = RKd(t) \times (1+10\%)$$

where RKd(t+1) and RKd(t) are respectively an edge width at the time t+1 and an edge width at the time t.

The edge angle is increased by 5°.

$$RKj(t+1) = RKj(t) + 5°$$

where RKj(t+1) and RKj(t) are respectively an edge angle at the time t+1 and an edge angle at the time t.

For the cutting temperature parameter evaluation criterion:

The edge of the tool suffers a high temperature in the cutting process. When the temperature of the tool rises continuously, the thermal fatigue of the tool is accelerated to shorten the lifetime. The experimental data reveals that with the elapse of cutting time, the cutting temperature of the tool shows an uptrend.

An initial temperature CT(0) is set as the reference value of the cutting temperature parameter, and when the cutting temperature parameter exceeds the second alert threshold of the initial temperature, the thermal fatigue of the tool is increased, a temperature warning is triggered, and the gradient edge geometry of the tool is adjusted.

The second alert threshold is set as 20%.

A cutting temperature at the time t is marked as CT(t). When $$\frac{CT(t)-CT(0)}{CT(0)} > 20\%$$

is satisfied, a warning state for the thermal fatigue of the tool is triggered, and only the edge width RKd is increased to relieve temperature accumulation.

The edge width is increased by 15%.

$$RKd(t+1) = RKd(t) \times (1+15\%)$$

where and RKd(t+1) and RKd(t) are respectively an edge width at the time t+1 and an edge width at the time t.

For the cutting vibration amplitude parameter evaluation criterion:

The cutting vibration amplitude parameter is an important factor to affect the machining accuracy and stability of the tool. When the cutting vibration amplitude parameter exceeds a threshold, the blade of the tool is broken easily or the surface quality of the workpiece is reduced easily.

An initial vibration amplitude CV(0) is set as the reference value of the cutting vibration amplitude parameter, and when the cutting vibration amplitude parameter increases to exceed the third alert threshold of the initial vibration amplitude, the tool being in an unstable vibration state, a vibration warning is triggered, and the gradient edge geometry of the tool is adjusted.

A cutting vibration amplitude parameter at the time t is set as CV(t). The third alert threshold is 50%.

When $$\frac{CV(t)-CV(0)}{CV(0)} > 50\%,$$

the edge angle is decreased. This can enhance stable contact between the tool and the workpiece, thereby reducing vibration of the tool, and improving stability of the tool.

The edge angle is decreased by 10°.

$$RKj(t+1) = RKj(t) - 10^\circ$$

where RKj(t+1) and RKj(t) are respectively an edge angle at the time t+1 and an edge angle at the time t.

Upon completion of the above adjustment, the cutting load parameter, the cutting temperature parameter and the cutting vibration amplitude parameter are re-tested, so as to gradually select the gradient edge geometry that exhibits optimal performance in the above three indexes. The finally selected edge geometry should have a low cutting force, a stable cutting temperature and a small vibration amplitude. The edge width and the edge angle in the final design solution are as follows:

Optimal RKd=initial value±adjustment range.

Optimal RKj=initial value±adjustment range.

Further, the preliminary adjustment strategy is acquired to optimize the gradient edge geometry of the end mill, the actual cutting experiment is performed by the adjusted end mill, and the cutting state data in the cutting experiment is continuously monitored, specifically:

The cutting state data monitored at the time t+1 of the actual cutting experiment in Step S3 is marked as CLm(t+1), CLs(t+1), CT(t+1), and CV(t+1).

Further, the cutting state data obtained in Step S3 is compared with the corresponding reference value and the corresponding alert value in Step S2 for the analysis, and from the cutting load parameter, the cutting temperature parameter and the cutting vibration amplitude parameter, the parameter exceeding the alert threshold set for the corresponding reference value is selected, specifically:

Based on the cutting load parameter evaluation criterion, a main cutting force exceeding the first alert threshold of the initial main cutting force is marked as CLm'(t+1).

Based on the cutting load parameter evaluation criterion, a side cutting force exceeding the first alert threshold of the initial side cutting force is marked as CLs'(t+1).

Based on the cutting temperature parameter evaluation criterion, a cutting temperature parameter exceeding the second alert threshold of the initial temperature is marked as CT'(t+1).

Based on the cutting vibration amplitude parameter evaluation criterion, a cutting vibration amplitude parameter exceeding the third alert threshold of the initial vibration amplitude is marked as CV'(t+1).

Further, the adjustment index is used for providing the fine adjustment strategy for the preliminary adjustment strategy according to the cutting state data selected in Step S4. Specifically:

The adjustment index is defined as $AI_{total}$ that is calculated by:

$$AI_{total} = \frac{w_1 \times AI_{CL} + w_2 \times AI_{CT} + w_3 \times AI_{CV}}{AI_{CL} + AI_{CT} + AI_{CV} + 1}$$

where $AI_{CL}$ is a cutting load adjustment index, and represents a relative variation of the cutting load parameter; and the $AI_{CL}$ is calculated by:

$$AI_{CL} = \frac{\sqrt{\left|\frac{CLm(t+1)-CLm(0)}{CLm(0)} + \frac{CLs(t+1)-CLs(0)}{CLs(0)}\right|} + \eta 1}{2}$$

where η1 is a positive constant term, and 0.08≤η1≤0.65, ensuring that the $AI_{CL}$ is greater than 0; and a specific value of the η1 is determined by the expert panel according experimental data.

$AI_{CT}$ is a cutting temperature adjustment index, and represents a relative variation of the cutting temperature; and the $AI_{CT}$ is calculated by:

$$AI_{CT} = \left|\frac{CT(t+1)-CT(0)}{CT(0)}\right| + \eta 2$$

where η2 is a positive constant term, and 0.03≤η2≤0.53, ensuring that the $AI_{CT}$ is greater than 0; and a specific value of the η2 is determined by the expert panel according experimental data.

$AI_{CV}$ is a cutting vibration adjustment index, represents a relative variation of the cutting vibration, and is calculated by:

$$AI_{CV} = \left|\frac{CV(t+1)-CV(0)}{CV(0)}\right| + \eta 3$$

where η3 is a positive constant term, and 0.011≤η3≤0.71, ensuring that the $AI_{CV}$ is greater than 0; a specific value of the η3 is determined by the expert panel according experimental data; and $w_1$, $w_2$ and $w_3$ are weight coefficients, $$\begin{cases} 0.12 \le w_1 \le 0.63 \\ 0.11 \le w_2 \le 0.69 \\ 0.13 \le w_3 \le 0.89 \\ w_1 + w_2 + w_3 = 1 \end{cases},$$

and determined by the expert panel according to a priority in the cutting process.

The fine adjustment strategy is provided for the preliminary adjustment strategy. Specifically:

Cutting state data exceeding the alert threshold in Step S4 is determined, parameters in the CLm'(t+1), the CLs'(t+1), the CT'(t+1), and the CV'(t+1) are sorted in a descending sequence, and according to a sorted result, an allocation proportion of a corresponding weight coefficient is adjusted as follows:

When any one of the CLm'(t+1) and the CLs'(t+1) is sorted at a first position, a current value of the $w_1$ is increased by 10%, and the $w_2$ and the $w_3$ are decreased by a same value, to ensure $w_1+w_2+w_3=1$.

When the CT'(t+1) is sorted at the first position, a current value of the $w_2$ is increased by 10%, and the $w_1$ and the $w_3$ are decreased by a same value, to ensure $w_1+w_2+w_3=1$.

When the CV'(t+1) is sorted at the first position, a current value of the $w_3$ is increased by 10%, and the $w_1$ and the $w_2$ are decreased by a same value, to ensure $w_1+w_2+w_3=1$.

An edge width RKd(t+1) upon the preliminary adjustment strategy is adjusted as:

$$RKd'(t+1) = \frac{RKd(t+1) \times (1 + \Delta RKd\,\%)}{AI_{total} + RKd(t+1) + \Delta RKd\,\%}$$

where ΔRKd % is a width adjusted percentage based on the adjustment index; and RKd'(t+1) is an adjusted edge width upon the fine adjustment strategy.

An edge angle RKj(t+1) upon the preliminary adjustment strategy is adjusted as:

$$RKj'(t+1) = \frac{RKj(t+1) + \Delta RKj^{\circ}}{AI_{total} + RKj(t+1) + \Delta RKj^{\circ}}$$

where ΔRKj° is an adjusted angle based on the adjustment index; and RKj'(t+1) is an adjusted edge angle upon the fine adjustment strategy.

1) Based on different numerical intervals of the $AI_{CL}$, the preliminary adjustment strategy on the width RKd and the angle RKj in Step S4 includes the following cases:

When $AI_{CL}<0.1$, the load changes little.

The preliminary adjustment strategy is to decrease the RKd by 10%, and increase the RKj by 5°.

The fine adjustment strategy is to decrease the adjustment range according to the adjustment index.

Adjustment on the RKd(t+1): ΔRKd %=−5%

Adjustment on the RKj(t+1): ΔRKj°=+2°.

When $0.1 \le AI_{CL} \le 0.3$, the load is increased significantly, and the adjustment is as follows:

The preliminary adjustment strategy is to decrease the RKd by 10%, and increase the RKj by 50.

The fine adjustment strategy is to maintain the preliminary adjustment range according to the adjustment index.

Adjustment on the RKd(t+1): ΔRKd %=−10%

Adjustment on the RKj(t+1): ΔRKj°=+5°.

When $AI_{CL}>0.3$, the load is increased greatly, and the adjustment is as follows:

The preliminary adjustment strategy is to decrease the RKd by 15%, and increase the RKj by 8°.

The fine adjustment strategy is to increase the adjustment range according to the adjustment index.

Adjustment on the RKd(t+1): ΔRKd %=+18%

Adjustment on the RKj(t+1): ΔRKj°=+9°

2) Based on different intervals of the $AI_{CT}$, the preliminary adjustment strategy is as follows:

When $AI_{CT}<0.05$, the temperature changes little, and the fine adjustment range is small.

The preliminary adjustment strategy is to increase the RKd by 15%.

The fine adjustment strategy is to reduce the adjustment range.

Adjustment on the RKd(t+1): ΔRKd %=+3%

RKj(t+1) keeps unchanged.

When $0.05 \le AI_{CT} \le 0.15$, the temperature rises to some extent, and intermediate adjustment is to be made.

The preliminary adjustment strategy is to increase the RKd by 15%.

The fine adjustment strategy is to increase the adjustment range properly according to the index.

Adjustment on the RKd(t+1): ΔRKd %=+17%

RKj(t+1) keeps unchanged.

When $AI_{CT}>0.15$, the temperature rises significantly, and significant adjustment is to be made.

The preliminary adjustment strategy is to increase the RKd by 20%.

The fine adjustment strategy is to further increase the adjustment range.

Adjustment on the RKd(t+1): ΔRKd %=+22%

RKj(t+1) keeps unchanged.

3) Based on different intervals of the $AI_{CV}$, the preliminary adjustment strategy is as follows:

When $AI_{CV}<0.2$, the vibration changes little, and the fine adjustment range is small.

The preliminary adjustment strategy is to decrease the RKj by 10°.

The fine adjustment strategy is to reduce the adjustment range.

Adjustment on the RKj(t+1): ΔRKj°=−3°.

RKd(t+1) keeps unchanged.

When $0.2 \le AI_{CV} \le 0.5$, the vibration is increased significantly, and intermediate adjustment is to be made.

The preliminary adjustment strategy is to decrease the RKj by 10°.

The fine adjustment strategy is to maintain the preliminary adjustment range.

Adjustment on the RKj(t+1): ΔRKj°=−10°.

RKd(t+1) keeps unchanged.

When $AI_{CV}>0.5$, the load is increased greatly, and significant adjustment is to be made:

The preliminary adjustment strategy is to decrease the RKj by 15°.

The fine adjustment strategy is to increase the adjustment range.

Adjustment on the RKj(t+1): ΔRKj°=−18°.

RKd(t+1) keeps unchanged.

Further, until the parameter included in the cutting state data meets the corresponding lifetime evaluation criterion, a specific stop condition includes:

According to the cutting load parameter evaluation criterion, $$\begin{cases} \frac{CLm(t+1)-CLm(0)}{CLm(0)} \le 30\% \\ \frac{CLs(t+1)-CLs(0)}{CLs(0)} \le 30\% \end{cases}$$

is taken as a loop stop condition for the cutting loading parameter.

According to the cutting temperature parameter evaluation criterion, $$\frac{CT(t+1)-CT(0)}{CT(0)} \le 20\%$$

is taken as a loop stop condition for the cutting temperature parameter.

According to the cutting vibration amplitude parameter evaluation criterion, $$\frac{CV(t+1)-CV(0)}{CV(0)} \leq 50\%$$

is taken as a loop stop condition for the cutting vibration amplitude parameter.

Embodiment 2

The present disclosure provides an end mill with a gradient edge geometry. The end mill with a gradient edge geometry is configured to implement the grinding method of an end mill with a gradient edge geometry.

The tool further includes shank 1 and chip flute 4.

At least four cutting blades 3 are provided on the cutter head 2. The cutting blade 3 includes a front portion provided with the chip flute 4, and a rear portion provided with the edge 5 and the end blade 6. A bottom blade intersecting with the cutting blade 3 is provided at a bottom of the cutter head 2. The edge 5 changes gradually along a guide line. Edges 5 on the at least four cutting blades 3 are provided alternately in an odd-numbered edge and an even-numbered edge. The odd-numbered edge and the even-numbered edge change inversely in geometry.

The bottom blade intersecting with the cutting blade 3 is provided at the bottom of the cutter head 2. The at least four cutting blades 3 are uniformly spaced in an axial direction of the cutter head 2.

From a tool tip to a tool tail, balanced cutting forces are realized, effectively reducing vibration in the cutting process.

The edge 5 is an inclined plane. Two sides of the edge 5 incline inward gradually along the guide line, such that the edge 5 width becomes gradually narrow from a bottom end to a shank 1 end. An inclination angle of the odd-numbered edge gradually changes from 10° to 30°. The edge 5 width is a distance narrowing gradually from an end blade 6 side to a shank 1 side. The edge width gradually changes from 0.4 mm to 0.8 mm. Meanwhile, ends at two sides of the odd-numbered edge change from a blunt geometry to a sharp geometry. The odd-numbered edge and the even-numbered edge change inversely in geometry. An inclination angle of the even-numbered edge gradually changes from 30° to 10°. Ends at two sides of the even-numbered edge change from a sharp geometry to a blunt geometry.

From the blunt geometry to the sharp geometry, the edge 5 angle is increased gradually, and the edge 5 becomes sharp from the blunt edge. The edge 5 geometry gradually changes sharp from the blunt edge, such that the edge 5 geometry changes stably. With the gradient design of the edge 5 geometry, the tool is versatile from rough machining to fine machining. The gradient edge 5 improves the chip breaking effect in the cutting process, and prevents adhesion to the tool.

The guide line is formed by connecting segments of a brachistochrone curve and a circular arc segment. The segments of the brachistochrone curve are respectively located at two ends of an edge 5 curve, such that a changing speed of the edge width is maximum, realizing quick transition to different cutting effects. The circular arc segment is located between the segments of the brachistochrone curve, such that the changing speed of the edge width is reduced gradually, realizing smooth change of the cutting effect.

In response to high-speed rotation of the cutter head 2 in the cutting process of the tool, the workpiece is cut by the end blade 6 and the edge 5. The edge 5 geometry is the inclined plane formed by sweeping from a semicircular curve along a guide curve. The two sides of the edges 5 incline inward gradually, such that the edge becomes gradually narrow from one end of the blade to the other end of the blade. Meanwhile, the edge 5 angle is increased gradually, and the edge 5 geometry becomes gradually sharp.

With the gradient design of the edge 5 geometry, from a rough portion to a fine portion of the tool, the present disclosure realizes the gradual layer-by-layer cutting effect, and can realize the rough machining and the fine machining in the cutting process. Such a design improves the adaptability of the tool, and realizes desirable transition from rough cutting to fine cutting, improving the chip breaking effect in the cutting process, and preventing adhesion to the tool, thereby improving overall cutting performance of the tool.

In the embodiment, the gradient geometry of the edge 5 can gradually thin the chip, reducing a flexural rigidity of the chip, and facilitating breakage of the chip. This can mitigate the problem that the nickel-based superalloy chip is not broken easily. With the gradient geometry of the edge 5, the load on each edge 5 can further be reduced, thereby alleviating the cutting load on the tool, relieving the wear on the tool, and improving the lifetime of the tool. The gradient geometry of the edge 5 facilitates breakage of the chip and evacuation of the chip, preventing the impact caused by chip piling. The breakage of the chip can also mitigate the cutting vibration, making the cutting process more stable. Because of the more stable cutting process, the surface quality and the machining accuracy of the workpiece can be improved.

In the embodiment, the tool includes a plurality of edges 5 that are respectively marked as the odd-numbered edge and the even-numbered edge. The odd-numbered edge changes the same in geometry. The geometries of the edges 5 change in a same manner. However, the odd-numbered edge and the even-numbered edge change inversely in geometry. With the design in which two edges 5 are symmetrical in geometry and change inversely, the odd-numbered edge of the tool is gradually narrow from one end of the blade to the other end of the blade, and the even-numbered edge is gradually wide from one end of the blade to the other end of the blade, realizing mutual-balanced cutting forces to effectively reduce the vibration in the cutting process.

In the embodiment, with the design in which the two edges 5 are symmetrical in geometry and change inversely, the cutting forces can be balanced mutually to effectively reduce the vibration in the cutting process. Through the involute geometry of the edge 5 from the positive to the negative, the chip is gradually thin, facilitating breakage of the chip, and alleviating the cutting load on each edge 5. Two edges 5 change inversely and gradually, which can balance the thickness of the chip, and maintain the relatively uniform the chip load, preventing the single blade from suffering the excessively large chip thickness. With the balanced cutting force and the uniform chip load, the stability of the cutting process is improved. The more stable cutting is beneficial to improve the surface quality and accuracy of the workpiece. The double-blade involute design makes reasonable use of the symmetrical and gradient principles, improving the cutting performance to the nickel-based superalloy.

In the embodiment, changing the geometry of the edge of the tool can alter the contact area between a flank face and a rake face of the tool as well as the contact state between the tool and the chip, thereby reducing friction between the tool and the workpiece. By changing the contact state between the tool and the chip, the probability of the chip adhesion is reduced. Moreover, due to the gradient design of the edge 5, the contact area between the single edge and the chip can be reduced gradually. This can take the desirable anti-adhesion effect, and directly reduce the cutting resistance in the cutting process. The anti-adhesion cutter not only can alleviate the load on the tool, but also can reduce the chip piling to improve the cutting stability. This is of great benefit for improving the cutting performance to difficult-to-cut materials such as the nickel-based superalloy.

All the above equations are converted to a dimensionless basis for pure numerical computation. Each of the foregoing formulas is derived software simulation based on extensive data collection, and closely approximates real-world values. Preset parameters in the equations are set by those skilled in the art according to actual situations.

Some or all of the foregoing embodiments may be implemented by software, hardware, firmware, or any combination thereof. When realized with software, the embodiments can be performed in a form of a computer program product in whole or in part. A person of ordinary skill in the art may be aware that, by combining the examples described in the embodiments disclosed in the present disclosure, units and algorithm steps may be implemented by electronic hardware or a combination of computer software and electronic hardware. Whether these functions are implemented by using hardware or software depends on the specific application of the technical solutions and design constraints.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of embodiments.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

The invention claimed is:

1. A grinding method of an end mill with a gradient edge geometry, applied to a tool, wherein the tool comprises a cutter head, a cutting blade, an edge, and an end blade, and the grinding method comprises:

step S1: for a same to-be-machined part, performing an actual machining experiment by end mills with different gradient edge geometries under a same cutting condition, so as to acquire cutting state data of each of the end mills with the different gradient edge geometries on the same to-be-machined part, wherein the gradient edge geometries each comprise an edge width and an edge angle; and the cutting state data comprises a cutting load parameter, a cutting temperature parameter, and a cutting vibration amplitude parameter applied to an edge:

sequentially marking the edge width and the edge angle as RKd and RKj, and setting a preliminary range of the edge width as 0.1 mm≤RKd≤0.5 mm;

setting a range of the edge angle as 10°≤RKj≤40°;

according to a parameter range of the gradient edge geometry, selecting end mills with different edge geometries, and preparing the end mills with the different gradient edge geometries in a grinding process;

measuring, by a force sensor in real time, the cutting load parameter applied to the tool in a cutting process of each end mill, wherein the cutting load parameter comprises a main cutting force and a side cutting force;

monitoring, by an infrared thermal imager or an embedded thermocouple sensor, the cutting temperature parameter of the edge of the tool; and recording, by a three-dimensional (3D) vibration sensor, the cutting vibration amplitude parameter of the tool in the cutting process;

step S2: according to experimental verification or evaluation of an expert panel, setting a lifetime evaluation criterion for the end mills with the different gradient edge geometries in the step S1, wherein the lifetime evaluation criterion is used for setting a reference value and an alert threshold for each parameter comprised in the cutting state data, and the alert threshold falls within a range of 0% to 100%; generating a preliminary adjustment strategy for the gradient edge geometry based on the reference value and the alert threshold; and adjusting the gradient edge geometry of the end mill based on the preliminary adjustment strategy;

wherein the lifetime evaluation criterion comprises a cutting load parameter evaluation criterion, a cutting temperature parameter evaluation criterion, and a cutting vibration amplitude parameter evaluation criterion:

sequentially marking the cutting load parameter, the cutting temperature parameter and the cutting vibration amplitude parameter as CL, CT and CV, sequentially marking the main cutting force and the side cutting force comprised in the cutting load parameter as CLm and CLs, sequentially marking an alert threshold of the cutting load parameter, an alert threshold of the cutting temperature parameter and an alert threshold of the cutting vibration amplitude parameter as a first alert threshold, a second alert threshold, and a third alert threshold, and adjusting the first alert threshold, the second alert threshold and the third alert threshold by the expert panel through experimental data; and sequentially marking an edge width and an edge angle adjusted through the preliminary adjustment strategy as RKd(t+1) and RKj(t+1), wherein t+1 in the RKd (t+1) and the RKj(t+1) is time when an actual cutting experiment in the following step S3 is performed;

step S3: performing the actual cutting experiment by an adjusted end mill, and continuously monitoring the cutting state data in the actual cutting experiment;

step S4: comparing the cutting state data obtained in the step S3 with a corresponding reference value and a corresponding alert value in the step S2 for analysis, and from the cutting load parameter, the cutting temperature parameter and the cutting vibration amplitude parameter, selecting a parameter exceeding an alert threshold set for the corresponding reference value;

step S5: performing combined analysis on the cutting load parameter, the cutting temperature parameter and the cutting vibration amplitude parameter comprised in the cutting state data in the step S3 to generate an adjustment index, wherein the adjustment index is used for providing a fine adjustment strategy for the gradient edge geometry of the end mill according to the cutting state data selected in the step S4; and adjusting the gradient edge geometry of the end mill based on the fine adjustment strategy; and step S6: repeating the step S3 to the step S5, until the cutting load parameter, the cutting temperature parameter and the cutting vibration amplitude parameter comprised in the cutting state data each meet a corresponding lifetime evaluation criterion.

2. The grinding method of the end mill with the gradient edge geometry according to claim 1, wherein for the cutting load parameter evaluation criterion:

taking an initial cutting load parameter of the tool with a gradient edge geometry as the reference value; and when the main cutting force or the side cutting force changes to exceed the first alert threshold of the reference value, determining that the tool is in a to-be-worn state, and adjusting the gradient edge geometry of the tool, wherein the first alert threshold is set as 30%;

respectively setting a main cutting force and a side cutting force at time t as CLm(t) and CLs(t); and respectively marking an initial main cutting force and an initial side cutting force as CLm(0) and CLs(0), and when the main cutting force CLm(t) or the side cutting force CLs(t) at any time meets the following condition, triggering a wear warning, wherein the preliminary adjustment strategy is to decrease the edge width RKd or increase the edge angle RKj:

$$\frac{CLm(t)-CLm(0)}{CLm(0)} > 30\%$$

$$\frac{CLs(t)-CLs(0)}{CLs(0)} > 30\%$$

for the cutting temperature parameter evaluation criterion:

setting an initial temperature CT(0) as the reference value of the cutting temperature parameter, and when the cutting temperature parameter exceeds the second alert threshold of the initial temperature, a thermal fatigue of the tool is increased, triggering a temperature warning, and adjusting the gradient edge geometry of the tool, wherein the second alert threshold is set as 20%;

marking a cutting temperature at the time t as CT(t); and when $$\frac{CT(t)-CT(0)}{CT(0)} > 20\%$$

is satisfied, triggering a warning state for the thermal fatigue of the tool, and only increasing the edge width RKd; and for the cutting vibration amplitude parameter evaluation criterion:

setting an initial vibration amplitude CV(0) as the reference value of the cutting vibration amplitude parameter, and when the cutting vibration amplitude parameter increases to exceed the third alert threshold of the initial vibration amplitude, the tool being in an unstable vibration state, triggering a vibration warning, and adjusting the gradient edge geometry of the tool;

setting a cutting vibration amplitude parameter at the time t as CV(t), wherein the third alert threshold is 50%; and when $$\frac{CV(t)-CV(0)}{CV(0)} > 50\%$$

is satisfied, decreasing the edge angle.

3. The grinding method of the end mill with the gradient edge geometry according to claim 2, wherein the preliminary adjustment strategy is acquired to optimize the gradient edge geometry of the end mill, the actual cutting experiment is performed by the adjusted end mill, and the cutting state data in the actual cutting experiment is continuously monitored, wherein:

the cutting state data monitored at the time t+1 of the actual cutting experiment in the step S3 is marked as CLm(t+1), CLs(t+1), CT(t+1), and CV(t+1).

4. The grinding method of the end mill with the gradient edge geometry according to claim 3, wherein the comparing the cutting state data obtained in the step S3 with the corresponding reference value and the corresponding alert value in the step S2 for the analysis, and from the cutting load parameter, the cutting temperature parameter and the cutting vibration amplitude parameter, selecting the parameter exceeding the alert threshold set for the corresponding reference value comprise:

based on the cutting load parameter evaluation criterion, marking a main cutting force exceeding the first alert threshold of the initial main cutting force as CLm'(t+1);

based on the cutting load parameter evaluation criterion, marking a side cutting force exceeding the first alert threshold of the initial side cutting force as CLs'(t+1);

based on the cutting temperature parameter evaluation criterion, marking a cutting temperature parameter exceeding the second alert threshold of the initial temperature as CT'(t+1); and based on the cutting vibration amplitude parameter evaluation criterion, marking a cutting vibration amplitude parameter exceeding the third alert threshold of the initial vibration amplitude as CV'(t+1).

5. The grinding method of the end mill with the gradient edge geometry according to claim 4, wherein the adjustment index is constructed as follows:

the adjustment index is defined as $AI_{total}$ and calculated by:

$$AI_{total} = \frac{w_1 \times AI_{CL} + w_2 \times AI_{CT} + w_3 \times AI_{CV}}{AI_{CL} + AI_{CT} + AI_{CV} + 1}$$

wherein $AI_{CL}$ is a cutting load adjustment index, and represents a relative variation of the cutting load parameter; and the $AI_{CL}$ is calculated by:

$$AI_{CL} = \frac{\sqrt{\left|\frac{CLm(t+1)-CLm(0)}{CLm(0)} + \frac{CLs(t+1)-CLs(0)}{CLs(0)}\right|} + \eta 1}{2}$$

wherein η1 is a first positive constant term, and 0.08≤η1≤0.65, ensuring that the $AI_{CL}$ is greater than 0; and $AI_{CT}$ is a cutting temperature adjustment index, and represents a variation of the cutting temperature parameter; and the $AI_{CT}$ is calculated by:

$$AI_{CT} = \left|\frac{CT(t+1)-CT(0)}{CT(0)}\right| + \eta 2$$

wherein η2 is a second positive constant term, and 0.03≤η2≤0.53, ensuring that the $AI_{CT}$ is greater than 0; and $AI_{CV}$ is a cutting vibration adjustment index, represents a variation of the cutting vibration amplitude parameter, and is calculated by:

$$AI_{CV} = \left|\frac{CV(t+1) - CV(0)}{CV(0)}\right| + \eta 3$$

wherein η3 is a third positive constant term, and 0.011≤η3≤0.71, ensuring that the $AI_{CV}$ is greater than 0; and $$\begin{cases} 0.12 \leq w_1 \leq 0.63 \\ 0.11 \leq w_2 \leq 0.69 \\ 0.13 \leq w_3 \leq 0.89 \\ w_1 + w_2 + w_3 = 1 \end{cases},$$

wherein $w_1$, $w_2$, and $w_3$ are weight coefficients.

6. The grinding method of the end mill with the gradient edge geometry according to claim 5, wherein the adjustment index is used for providing the fine adjustment strategy for the preliminary adjustment strategy according to the cutting state data selected in the step S4, wherein:

providing the fine adjustment strategy for the preliminary adjustment strategy, comprising:

determining cutting state data exceeding the alert threshold in the step S4, sorting parameters in the CLm'(t+1), the CLs'(t+1), the CT'(t+1), and the CV'(t+1) in a descending sequence, and according to a sorted result, adjusting an allocation proportion of a corresponding weight coefficient as follows:

when any one of the CLm'(t+1) and the CLs'(t+1) is sorted at a first position, increasing a current value of the $w_1$ by 10%, and decreasing the $w_2$ and the $w_3$ by a same value, to ensure $$w_1 + w_2 + w_3 = 1;$$

when the CT'(t+1) is sorted at the first position, increasing a current value of the $w_2$ by 10%, and decreasing the $w_1$ and the $w_3$ by a same value, to ensure $w_1+w_2+w_3=1$; and when the CV'(t+1) is sorted at the first position, increasing a current value of the $w_3$ by 10%, and decreasing the $w_1$ and the $w_2$ by a same value, to ensure $w_1+w_2+w_3=1$;

adjusting an edge width RKd(t+1) upon the preliminary adjustment strategy as:

$$Rkd'(t+1) = \frac{RKd(t+1) \times (1 + \Delta RKd\,\%)}{AI_{total} + RKd(t+1) + \Delta RKd\,\%}$$

wherein ΔRKd % is a width adjusted percentage based on the adjustment index; and RKd'(t+1) is an adjusted edge width upon the fine adjustment strategy; and adjusting an edge angle RKj(t+1) upon the preliminary adjustment strategy as:

$$RKj'(t+1) = \frac{RKj(t+1) + \Delta RKj^{\circ}}{AI_{total} + RKj(t+1) + \Delta RKj^{\circ}}$$

wherein ΔRKj° is an adjusted angle based on the adjustment index; and RKj'(t+1) is an adjusted edge angle upon the fine adjustment strategy.

7. The grinding method of the end mill with the gradient edge geometry according to claim 6, wherein until the parameter comprised in the cutting state data meets the corresponding lifetime evaluation criterion, a specific stop condition comprises:

according to the cutting load parameter evaluation criterion, taking $$\begin{cases} \dfrac{CLm(t+1) - CLm(0)}{CLm(0)} \leq 30\% \\ \dfrac{CLs(t+1) - CLs(0)}{CLs(0)} \leq 30\% \end{cases}$$

as a loop stop condition for the cutting loading parameter;

according to the cutting temperature parameter evaluation criterion, taking $$\frac{CT(t+1) - CT(0)}{CT(0)} \leq 20\%$$

as a loop stop condition for the cutting temperature parameter; and according to the cutting vibration amplitude parameter evaluation criterion, taking $$\frac{CV(t+1) - CV(0)}{CV(0)} \leq 50\%$$

as a loop stop condition for the cutting vibration amplitude parameter.

8. An end mill with a gradient edge geometry, configured to implement the grinding method of the end mill with the gradient edge geometry according to claim 1, wherein the tool further comprises a shank and a chip flute;

at least four cutting blades are provided on the cutter head; each of the at least four cutting blades comprises a front portion provided with the chip flute, and a rear portion provided with the edge and the end blade; a bottom blade intersecting with the cutting blade is provided at a bottom of the cutter head; the edge gradually changes along a guide line; edges on the at least four cutting blades are provided alternately in an odd-numbered edge and an even-numbered edge; and the odd-numbered edge and the even-numbered edge change inversely in geometry;

the bottom blade intersecting with the cutting blade is provided at the bottom of the cutter head; and the at least four cutting blades are uniformly spaced in an axial direction of the cutter head;

the edge is an inclined plane; two sides of the edge incline inward gradually along the guide line; and the edge width is a distance narrowing gradually from an end blade side to a shank side; and the guide line is formed by connecting segments of a brachistochrone curve and a circular arc segment; and the circular arc segment is located between the segments of the brachistochrone curve, such that a changing speed of the edge width is reduced gradually.

9. The end mill with the gradient edge geometry according to claim 8, wherein in the grinding method of the end mill with the gradient edge geometry, for the cutting load parameter evaluation criterion:

taking an initial cutting load parameter of the tool with a gradient edge geometry as the reference value; and when the main cutting force or the side cutting force changes to exceed the first alert threshold of the reference value, determining that the tool is in a to-be-worn state, and adjusting the gradient edge geometry of the tool, wherein the first alert threshold is set as 30%;

respectively setting a main cutting force and a side cutting force at time t as CLm(t) and CLs(t); and respectively marking an initial main cutting force and an initial side cutting force as CLm(0) and CLs(0), and when the main cutting force CLm(t) or the side cutting force CLs(t) at any time meets the following condition, triggering a wear warning, wherein the preliminary adjustment strategy is to decrease the edge width RKd or increase the edge angle RKj:

$$\frac{CLm(t) - CLm(0)}{CLm(0)} > 30\%$$

$$\frac{CLs(t) - CLs(0)}{CLs(0)} > 30\%$$

for the cutting temperature parameter evaluation criterion:

setting an initial temperature CT(0) as the reference value of the cutting temperature parameter, and when the cutting temperature parameter exceeds the second alert threshold of the initial temperature, a thermal fatigue of the tool is increased, triggering a temperature warning, and adjusting the gradient edge geometry of the tool, wherein the second alert threshold is set as 20%;

marking a cutting temperature at the time t as CT(t); and when $$\frac{CT(t) - CT(0)}{CT(0)} > 20\%$$

is satisfied, triggering a warning state for the thermal fatigue of the tool, and only increasing the edge width RKd; and for the cutting vibration amplitude parameter evaluation criterion:

setting an initial vibration amplitude CV(0) as the reference value of the cutting vibration amplitude parameter, and when the cutting vibration amplitude parameter increases to exceed the third alert threshold of the initial vibration amplitude, the tool being in an unstable vibration state, triggering a vibration warning, and adjusting the gradient edge geometry of the tool;

setting a cutting vibration amplitude parameter at the time t as CV(t), wherein the third alert threshold is 50%; and when $$\frac{CV(t) - CV(0)}{CV(0)} > 50\%$$

is satisfied, decreasing the edge angle.

10. The end mill with the gradient edge geometry according to claim 9, wherein in the grinding method of the end mill with the gradient edge geometry, the preliminary adjustment strategy is acquired to optimize the gradient edge geometry of the end mill, the actual cutting experiment is performed by the adjusted end mill, and the cutting state data in the actual cutting experiment is continuously monitored, wherein:

the cutting state data monitored at the time t+1 of the actual cutting experiment in the step S3 is marked as CLm(t+1), CLs(t+1), CT(t+1), and CV(t+1).

11. The end mill with the gradient edge geometry according to claim 10, wherein in the grinding method of the end mill with the gradient edge geometry, the comparing the cutting state data obtained in the step S3 with the corresponding reference value and the corresponding alert value in the step S2 for the analysis, and from the cutting load parameter, the cutting temperature parameter and the cutting vibration amplitude parameter, selecting the parameter exceeding the alert threshold set for the corresponding reference value comprise:

based on the cutting load parameter evaluation criterion, marking a main cutting force exceeding the first alert threshold of the initial main cutting force as CLm'(t+1);

based on the cutting load parameter evaluation criterion, marking a side cutting force exceeding the first alert threshold of the initial side cutting force as CLs'(t+1);

based on the cutting temperature parameter evaluation criterion, marking a cutting temperature parameter exceeding the second alert threshold of the initial temperature as CT'(t+1); and based on the cutting vibration amplitude parameter evaluation criterion, marking a cutting vibration amplitude parameter exceeding the third alert threshold of the initial vibration amplitude as CV'(t+1).

12. The end mill with the gradient edge geometry according to claim 11, wherein in the grinding method of the end mill with the gradient edge geometry, the adjustment index is constructed as follows:

the adjustment index is defined as $AI_{total}$ and calculated by:

$$AI_{total} = \frac{w_1 \times AI_{CL} + w_2 \times AI_{CT} + w_3 \times AI_{CV}}{AI_{CL} + AI_{CT} + AI_{CV} + 1}$$

wherein $AI_{CL}$ is a cutting load adjustment index, and represents a relative variation of the cutting load parameter; and the $AI_{CL}$ is calculated by:

$$AI_{CL} = \frac{\sqrt{\left|\frac{CLm(t+1) - CLm(0)}{CLm(0)} + \frac{CLs(t+1) - CLs(0)}{CLs(0)}\right|} + \eta 1}{2}$$

wherein η1 is a first positive constant term, and 0.08=η1≤0.65, ensuring that the $AI_{CL}$ is greater than 0; and $AI_{CT}$ is a cutting temperature adjustment index, and represents a variation of the cutting temperature parameter; and the $AI_{CT}$ is calculated by:

$$AI_{CT} = \left|\frac{CT(t+1) - CT(0)}{CT(0)}\right| + \eta 2$$

wherein η2 is a second positive constant term, and $0.03 \leq \eta 2 \leq 0.53$, ensuring that the $AI_{CT}$ is greater than 0; and $AI_{CV}$ is a cutting vibration adjustment index, represents a variation of the cutting vibration amplitude parameter, and is calculated by:

$$AI_{CV} = \left| \frac{CV(t+1) - CV(0)}{CV(0)} \right| + \eta 3$$

wherein η3 is a third positive constant term, and $0.011 \leq \eta 3 \leq 0.71$, ensuring that the $AI_{CV}$ is greater than 0; and $$\begin{cases} 0.12 \leq w_1 \leq 0.63 \\ 0.11 \leq w_2 \leq 0.69 \\ 0.13 \leq w_3 \leq 0.89 \\ w_1 + w_2 + w_3 = 1 \end{cases},$$

wherein $w_1$, $w_2$, and $w_3$ are weight coefficients.

13. The end mill with the gradient edge geometry according to claim 12, wherein in the grinding method of the end mill with the gradient edge geometry, the adjustment index is used for providing the fine adjustment strategy for the preliminary adjustment strategy according to the cutting state data selected in the step S4, wherein:

providing the fine adjustment strategy for the preliminary adjustment strategy, comprising:

determining cutting state data exceeding the alert threshold in the step S4, sorting parameters in the CLm'(t+1), the CLs'(t+1), the CT'(t+1), and the CV'(t+1) in a descending sequence, and according to a sorted result, adjusting an allocation proportion of a corresponding weight coefficient as follows:

when any one of the CLm'(t+1) and the CLs'(t+1) is sorted at a first position, increasing a current value of the $w_1$ by 10%, and decreasing the $w_2$ and the $w_3$ by a same value, to ensure $$w_1 + w_2 + w_3 = 1;$$

when the CT'(t+1) is sorted at the first position, increasing a current value of the $w_2$ by 10%, and decreasing the $w_1$ and the $w_3$ by a same value, to ensure $w_1+w_2+w_3=1$; and when the CV'(t+1) is sorted at the first position, increasing a current value of the $w_3$ by 10%, and decreasing the $w_1$ and the $w_2$ by a same value, to ensure $w_1+w_2+w_3=1$;

adjusting an edge width RKd(t+1) upon the preliminary adjustment strategy as:

$$RKd'(t+1) = \frac{RKd(t+1) \times (1 + \Delta RKd\ \%)}{AI_{total1} + RKd(t+1) + \Delta RKd\ \%}$$

wherein ΔRKd % is a width adjusted percentage based on the adjustment index; and RKd'(t+1) is an adjusted edge width upon the fine adjustment strategy; and adjusting an edge angle RKj(t+1) upon the preliminary adjustment strategy as:

$$RKj'(t+1) = \frac{RKj(t+1) + \Delta RKj^\circ}{AI_{total} + RKj(t+1) + \Delta RKj^\circ}$$

wherein ΔRKj° is an adjusted angle based on the adjustment index; and RKj'(t+1) is an adjusted edge angle upon the fine adjustment strategy.

14. The end mill with the gradient edge geometry according to claim 13, wherein in the grinding method of the end mill with the gradient edge geometry, until the parameter comprised in the cutting state data meets the corresponding lifetime evaluation criterion, a specific stop condition comprises:

according to the cutting load parameter evaluation criterion, taking $$\begin{cases} \frac{CLm(t+1) - CLm(0)}{CLm(0)} \leq 30\% \\ \frac{CLs(t+1) - CLs(0)}{CLs(0)} \leq 30\% \end{cases}$$

as a loop stop condition for the cutting loading parameter;

according to the cutting temperature parameter evaluation criterion, taking $$\frac{CT(t+1) - CT(0)}{CT(0)} \leq 20\%$$

as a loop stop condition for the cutting temperature parameter; and according to the cutting vibration amplitude parameter evaluation criterion, taking $$\frac{CV(t+1) - CV(0)}{CV(0)} \leq 50\%$$

as a loop stop condition for the cutting vibration amplitude parameter.

* * * * *